July 18, 1950 A. R. DOUCETTE 2,515,638

ASSEMBLY FOR COMMUNICATION APPARATUS

Filed June 23, 1947 2 Sheets-Sheet 1

INVENTOR.
Adrian R. Doucette
BY [signature]
His Attorney

July 18, 1950 A. R. DOUCETTE 2,515,638

ASSEMBLY FOR COMMUNICATION APPARATUS

Filed June 23, 1947 2 Sheets-Sheet 2

INVENTOR.
Adrian R. Doucette
BY
His Attorney

Patented July 18, 1950

2,515,638

UNITED STATES PATENT OFFICE 2,515,638

ASSEMBLY FOR COMMUNICATION APPARATUS

Adrian R. Doucette, Swissvale, Pa., assignor to The Union Switch & Signal Company, Swissvale, Pa., a corporation of Pennsylvania Application June 23, 1947, Serial No. 756,363

2 Claims. (Cl. 175—298)

Figures 1, 2, 3, 6:
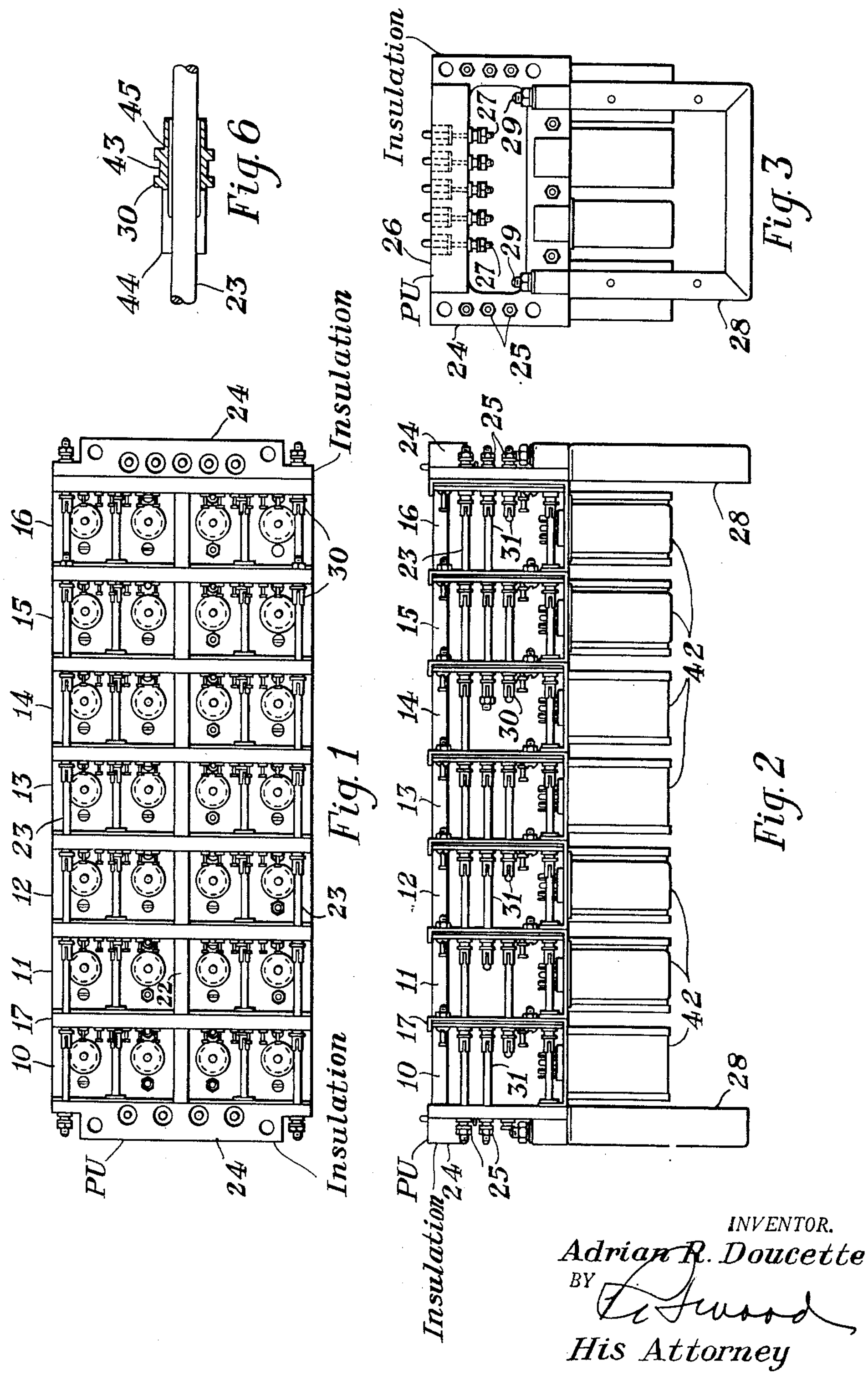

My invention relates to an assembly for communication apparatus, and more particularly to a portable unit for carrier telephone apparatus.

Communication apparatus in many cases uses a modulated carrier current and in radio and carrier induction systems the apparatus includes stages of electron tube amplifiers, modulators, demodulators and oscillators. Also, communication apparatus of the type here contemplated is often arranged as a portable unit and under such circumstances it is necessary that the apparatus be assembled in a compact and rigid manner to permit easy handling and to avoid damage and unreliable operation when the unit is being carried about. Again, portable units should be light and of dimensions that make it easy for the operator to carry and to permit him to perform other tasks while using the unit.

In the manufacturing of communication apparatus it is necessary to make frequent inspections and tests and it is in the interest of economy of construction and maintenance to have the apparatus arranged in separate entities or sections which can be individually built and tested before they are put together to form an assembly or unit.

In view of the foregoing circumstances in the construction and maintenance of communication apparatus, a feature of my invention is the provision of an improved assembly for communication apparatus.

Another feature of my invention is the provision of an improved manner of assembling communication apparatus arranged in entities or sections into a single unit.

Again, a feature of my invention is the provision of an improved portable assembly and unit for the apparatus of a carrier telephone system.

A more specific feature of my invention is the provision of a novel and improved portable unit for an inductive carrier railway train telephone system.

Other features, objects and advantages of my invention will appear as the specification progresses.

To attain the foregoing features, objects and advantages of my invention, I arrange the communication apparatus into separate sections each of which includes one or more stages of the apparatus. That is, the different stages of the receiving apparatus are grouped into a given number of sections and similarly the stages of the transmitting apparatus are grouped into different sections. The elements of a section are arranged on a chassis, the chassis being basically the same for all sections, the difference in the sections being in the electrical elements included therein and in the wiring thereof. The chassis is formed for any number of them to be fitted together so that the several sections of the apparatus can be arranged in any desired sequence. These sections of the apparatus when fitted together are held together by connecting rods. These rods are arranged to not only hold the sections together mechanically, but also to serve as electrical conductors for completing the electrical circuits between the sections. Connecting rods extending through the entire group of sections carry currents common to the several sections. Other connecting rods are run from one section to the next or, as required, to carry current between closely associated sections. Each chassis is provided with a bumper post to prevent buckling of the entire group of sections of the assembly when the connecting rods are drawn down tight. Terminal blocks are fitted to the end sections and secured thereto by the through connecting rods. These terminal blocks serve as end supports for the assembly and also as means for mounting terminals for connecting outside circuits to the apparatus of the assembly.

Novel jacks are mounted on the chassis of the different sections to engage the connecting rods when the rods are inserted through the chassis. These jacks insure a reliable electrical connection of the rods to the circuits with which the rods are associated.

Such an assembly lends itself to economical production since the elements of each section can be put together, wired and tested to detect any faulty element or wiring before the final assembly of the several sections is made. Also the several sections can be quickly secured together by the through rods being bolted to the terminal blocks. After the unit has been in service any section can be taken out and replaced by a new section by loosening the rods at the terminal blocks to loosen up the sections, the wiring of the apparatus not being disturbed either at the sections or at the terminal blocks.

I shall describe one form of assembly and unit for communication apparatus embodying my invention and shall then point out the novel features thereof in claims.

Figure 5:
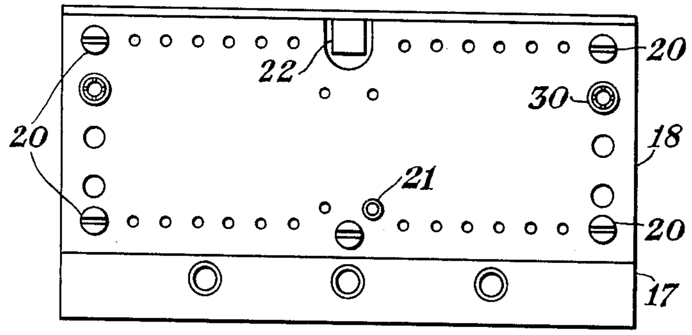
Figure 4:
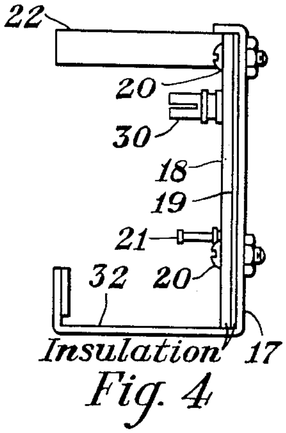
Figure 7:
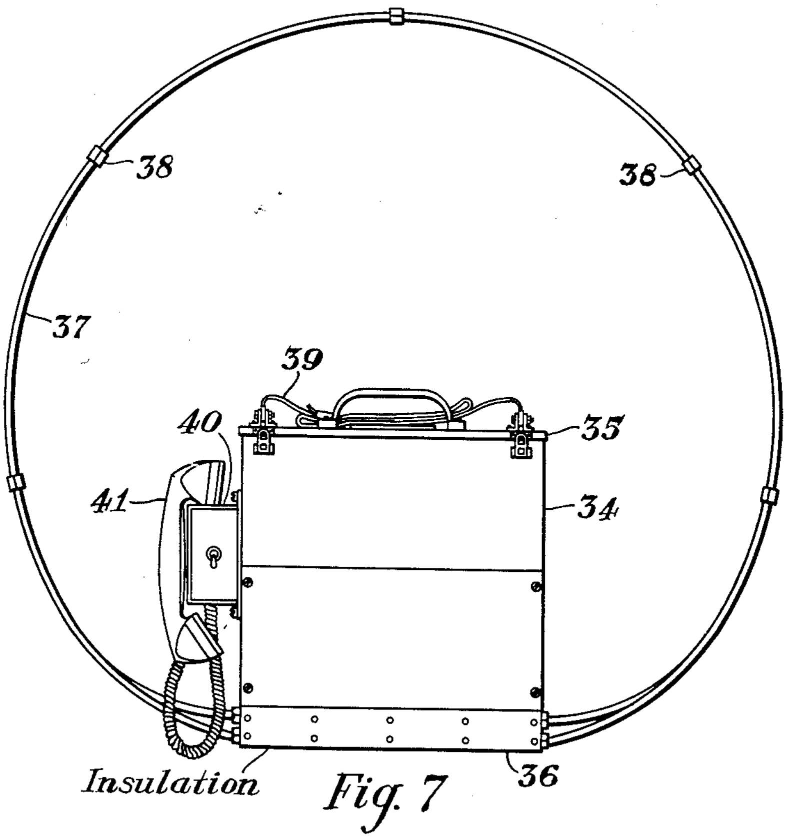

In the accompanying drawings, Figs. 1, 2, and 3 are top, side, and end views, respectively, showing a communication apparatus assembly embodying my invention when used with a portable unit of an inductive carrier railway train telephone system. Figs. 4 and 5 are end and front views, respectively, showing the section chassis of the assembly of Figs. 1, 2, and 3. Fig. 6 is an enlarged sectional view showing the jack for making connection to the connecting rods of the assembly of Figs. 1, 2, and 3. Fig. 7 is a side view showing the construction of the portable unit for the assembly of Figs. 1, 2, and 3, and which also embodies the invention.

It is to be understood that my invention is not limited to railway train carrier telephone systems and this one application serves to illustrate the many places the structure is useful.

In each of the several views like reference characters are used to designate similar parts.

Referring to Figs. 1, 2, and 3, the reference character PU designates an assembly of communication apparatus. As here disclosed, the assembly PU is arranged in seven sections identified by the numerals 10 to 16, inclusive. As will be apparent from the following description, a larger or a lesser number of sections of the apparatus can be used according to the form of communication apparatus involved. The assembly PU here illustrated is that for a two-way railway train telephone system similar to that disclosed in an application for Letters Patent of the United States, Serial No. 575,311, filed January 30, 1945, now Patent No. 2,484,680, by Paul N. Bossart, for Railway Train Communication Systems, when modified to use only one carrier frequency channel and to omit the calling feature. To be more specific, this apparatus comprises a transmitter and a receiver which use frequency modulation, the transmitter being of the reactance modulator type and the receiver being of the heterodyne form. The several stages of the receiver are arranged into four sections and constitute the sections 10, 11, 12, and 13 of the assembly PU. The several stages of the transmitter are arranged into three sections which constitute the sections 14, 15, and 16 of the assembly.

The elements that go to make up each section of the apparatus are mounted on a chassis 17 which as best shown in Figs. 4 and 5 is an L-shaped member of a designated length and height. The chassis 17 may be of any suitable material and preferably is of a light metallic material, such as aluminum. The chassis 17 is the same for all sections of the assembly and a description of the mounting of the elements of one section on the chassis is sufficient for an understanding of them all. Looking at Figs. 4 and 5, two insulation members 18 and 19 are secured on the inside surface of the long leg of the chassis, the top of the long leg being turned over to position the members 18 and 19 and the members being further secured in place on the chassis by bolts 20. The outer member 18 is drilled for the insertion and riveting of terminal posts thereto; one such post being shown at 21, although a relatively large number of such terminal posts are provided. These terminal posts 21 are used for making circuit connections between the several elements of the apparatus of the section, the connecting wires being soldered to the post 21. The resistors, capacitors and other light weight elements of the section are held in place on the member 18 by their connections to the terminal posts 21. The inner insulation member 19 serves to keep the terminal posts 21 from coming in contact with metal chassis 17 to avoid grounding and short circuiting of the associated circuit.

The lower portion 32, as viewed in Figs. 4 and 5, of the chassis 17 is drilled to receive the bases of the electron tubes 42 and other elements of the apparatus, these tubes and elements being secured to the chassis in any suitable manner. The tubes and elements with their usual shields extend down from the chassis as shown in Figs. 1 and 2 and the bases and terminals extend upward and are convenient for being wired to the terminal posts 21 of the section, and in this way the tubes and other elements can be readily wired together. It follows that the tubes, resistors, capacitors and elements that go to make up a section of the apparatus are mounted on a chassis 17 and the section can be handled as a single piece of equipment for inspection and testing.

For reasons to appear hereinafter, a bumper post 22 is riveted or otherwise secured to the upper end of the long leg of the chassis 17 to extend through slots in the members 18 and 19, the outer end of the post 22 being in the vertical plane of the outer surface of the short leg of the chassis.

With the chassis constructed in the manner here described, it is clear that the several chassis can be arranged side by side, the outer end of post 22 and outer surface of the short leg of each chassis butting up against the outer surface of the long leg of the adjacent chassis. Also with the chassis thus fitting together, the different sections can be arranged in any desired sequence.

These several sections are secured together by connecting rods 23 which extend the full length of the assembled sections, there being at least two such connecting rods one on each side of the sections, but additional rods can be provided. To permit the rods 23 to extend through the sections one after the other, the insulation plates 18 and 19 and the long leg of the chassis are drilled or otherwise formed with holes that align, there being a row of aligning holes for each rod 23. The holes in the insulation members 18 and 19 are made enough larger than the diameter of the rods 23 to receive jacks through which the rods 23 slide, as will be explained shortly, and the holes in the legs of the chassis are made enough larger than the rods to assure that the chassis does not come in contact with the rods.

Jacks 30 are mounted, one in each of the aligning holes of the insulation members 18, a base portion 45, see Fig. 6, of the jack being riveted in member 18. Each jack 30 is drilled for rods 23 to slide through and is formed with a collar 43 to which lead wires from terminal posts 21 can be soldered. To assure positive contact of a jack with a rod 23 even with some slight misalignment due to errors in production, the jacks are made from spring tempered material, such as phosphor bronze tubing, which is a few thousandths of an inch smaller in inside diameter than the connecting rods. As best shown in the enlarged view of Fig. 6, the jack 30 is slotted into spring leaves 44 by deep saw cuts. The base 45 of the jack is then counterbored to a few thousandths of an inch larger than the diameter of the connector rods 23 and this counterbore extends through the jack except for a short distance, such as one-eighth inch, at the tip. In this way positive spring pressure at the tip of the jack against the connecting rod is assured at all times. Preferably, the connecting rods and the jacks are silver plated.

Terminal blocks 24 are provided, one in each end of the sections when they are arranged in the manner explained hereinbefore. These blocks 24 serve to anchor the connecting rods 23 and for the mounting of terminals for connections of the apparatus of the assembly to outside circuits. These terminal blocks 24 are of suitable insulation material and of a thickness to assure ample stiffness. As best shown in Figs. 2 and 3, the blocks 24 are formed with holes that align with the rows of holes provided in the chassis and insulation plates of the sections for the rods 23. These holes in blocks 24 are threaded to receive terminal bushings 25 which have a threaded portion to screw into the block 24 and which are drilled for the connecting rods 23 to slide therethrough. The terminal bushings 25 are also formed with a collar for receiving lead wires from terminals to be referred to shortly. The ends of the connecting rods 23 are threaded so that when the rods are inserted through the jacks 30 of the different sections and through the terminal bushings 25 of the blocks 24, and nuts are run down on the ends of the rods, the several sections are pulled together to form a compact assembly, the bumper post 22 preventing buckling of the chassis as the nuts on the rods 23 are pulled down tight.

The terminal blocks 24 are formed with a relatively thick portion 26 which in turn is formed with sockets in which terminals 27 are secured through terminal bushings 25 screwed into holes of the portion 26. The terminals 27 are made of the plug-in type to engage the receptacles of plug-in connectors to complete connections between the apparatus of the assembly and outside circuits. As pointed out hereinbefore, the terminal bushings 25 are formed with a collar by which lead wires can be soldered thereto, thus making it possible for any plug terminal 27 to be connected to any one of the connecting rods 23.

A metallic frame-like member 28 is secured to lugs of each terminal block 24, as by bolts 29. These two members 28 are made a little longer than the length of any of the electron tubes and shields of the several sections of the apparatus. In this way the members 28 serve as a support on which the entire assembly can rest as it is being tested and inspected. Also, the members 28 serve as a means for handling the assembly when placing the assembly in a case in which it is housed when in service.

In addition to the through connecting rods 23, other rods 31 are provided. The rods 31 are the same diameter as the rods 23 and thus the rods 31 can be inserted through jacks 30 secured in aligned holes of the chassis. The rods 31 are used for connecting circuits of adjacent sections by insertion of the rods through jacks of the adjacent sections, the rods 31 being of a length sufficient to connect between any two or any desired number of the sections. These rods 31 when inserted into the jacks 30 are held in place by the friction of the contact of the jacks with the rods.

Referring now to Fig. 7, the assembly of apparatus of Figs. 1, 2, and 3 is housed in a case 34 of suitable material, the case 34 being of dimensions for the associated assembly PU to be readily placed therein when the top cover 35 of the case is removed. In addition to housing the assembly of apparatus the case 34 is also used to house a suitable source of power for the apparatus, which source of power may be dry batteries or a low voltage storage battery and a vibrator. The case 34 is secured to a tray 36 of insulation material. This tray 36 also serves as a means for anchoring an inductor 37.

The inductor 37 is preferably an air core coil of one or more turns of a relatively stiff conductor of a light material, such as aluminum. The turns of the inductor coil 37 pass through the ends of the tray 36 and the ends of the coil are terminaled on the underside of the tray for connection with the apparatus in the case 34. In other words, the conductor used for forming the coil 37 is of a diameter large enough so that the coil is stiff and self-supporting. In practicing the invention I have found that an aluminum conductor of a diameter of the order of one-quarter inch is satisfactory. Preferably several spacers 38 of insulating material are spaced about the coil 37 to hold the turns of the coil apart when more than one turn is used. For reasons to appear shortly, the coil 37 is preferably made of a diameter of the order of thirty inches, but coils of other diameters can be used. Thus, the coil 37 forms a loop which is adaptable of sending and receiving a carrier telephone current by induction, and which loop is terminaled in the tray 36 for connection to the apparatus housed in the case 34, the case 34 being secured to the tray 36 so as to be inside of the loop.

The cover 35 is secured to the case 34 by any suitable form of fasteners, and the cover in turn has secured thereto a carrying strap 39.

An operator wishing to carry the unit comprising the inductor 37 and the assembly of the apparatus housed in the case 34 would put the carrying strap 39 over his shoulder for the unit to be suspended at his side, the inductor 37 being self-supporting and of a diameter sufficient so that it will pass over the operator's shoulder to be free of contact with his clothing. Furthermore, the size of the inductor 37 is sufficient to insure effective inductive relation with nearby line circuits used as a transmitting channel for the carrier telephone current.

One end of the case 34 is fitted with a control box 40 which is formed for the carrying of a hand set 41 thereon, and which hand set is cable connected to the apparatus within the case 34. Thus during non-communication periods the hand set 41 is carried on the unit out of the way of the operator and is handy for the operator to use while telephoning.

The apparatus assembly and portable unit here disclosed has the advantages that the apparatus can be constructed in sections for economy of construction and proper testing and inspection and which sections are secured together in a compact assembly by rods that both secure the sections mechanically and serve as an electrical conductor between associated elements of the different sections. The assembly is of a construction that it is housed in a case readily mountable inside of a self-supporting coil or inductor for effective sending and receiving of a carrier telephone current by induction. The unit when carried by an operator is suspended at his side to be carried with a minimum of inconvenience to him while performing his other tasks and is readily accessible for telephone purposes.

Although I have herein shown and described but one form of assembly and portable unit for communication apparatus embodying my invention, it is understood that various changes and modifications may be made therein within the scope of the appended claims without departing from the spirit and scope of my invention.

Having thus described my invention, what I claim is:

1. In an assembly of communication apparatus consisting of a number of different elements, the combination comprising, a plurality of L-shaped chassis; the elements of a selected portion of said apparatus mounted on each of said chassis, each chassis and its elements forming a section of the apparatus; said chassis being alike and being assembled in an aligned group with the outer end of the short leg of each chassis against the outer surface of the long leg of the adjacent chassis except for the first one of the chassis, two terminal blocks of insulating material one being fitted to each end of the assembled chassis, the long leg of each chassis and said terminal blocks being formed with openings which are arranged in such a manner as to provide a plurality of rows of aligned holes when the chassis are assembled in said group and the terminal blocks are fitted to the ends of the group, a plurality of jacks of electrical conducting material mounted one in each of the holes of said chassis and insulated from the chassis, each said jack slotted at one end to form spring contact leaves, each said jack being formed with an outer surface to which an electrical connection with an element of the apparatus can be made, a plurality of connecting rods of electrical conducting material one for each of said rows of aligned holes, each said rod being made of a diameter that each rod electrically engages the spring contact leaves of each jack of the aligned row of holes in which the rod is inserted to enable each rod to electrically connect selected elements of the different sections of the apparatus, each said rod having its two ends threaded to receive nuts and being made of a length to extend through the assembled chassis and terminal blocks to enable the chassis and blocks to be mechanically drawn together by nuts on the rods, and bumper posts one secured to the upper inside surface of the long leg of each said chassis and each post being made of a length to avoid buckling of the chassis when the nuts of the rods are drawn down tight.

2. In an assembly of communication apparatus, the combination comprising, a plurality of L-shaped chassis, insulation strips one fitted to the inside surface of the long leg of each said chassis, selected elements of said apparatus mounted on each said insulation strip and the short leg of each chassis for each chassis and its elements to form an independent section of the apparatus. said chassis being alike and being assembled in an aligned group with the short leg of each chassis against the outer surface of the long leg of the adjacent chassis except for a first one of the chassis, two terminal blocks of insulating material one fitted to each end of said group of chassis, said insulation strips and the long legs of the chassis being drilled in an arrangement that a plurality of rows of aligned holes are formed when the chassis are assembled in said group, a jack of electrical conducting material secured one in each of the holes of said insulation strips, each said jack being slotted at one end to form spring contact leaves, each said jack being formed with an outer surface to which electrical connection with an element of the apparatus can be made, said terminal blocks formed with holes that align with selected ones of said rows of aligned holes, a terminal bushing being secured in each of said holes in the terminal blocks, each said bushing being formed with an outer surface to which an outside circuit can be connected, through connecting rods one for each of said rows of holes aligned with holes in said terminal blocks, each said through rod being made of a diameter that each rod electrically engages the contact leaves of each jack and said bushings of the aligned row of holes in which the rod is inserted to enable outside circuits to be electrically connected to selected elements of the apparatus, each said through rod being of a length to extend through the assembled chassis and terminal blocks and having threaded ends to receive nuts to mechanically secure said group of chassis and terminal blocks, short connecting rods one for each of certain ones of said rows of holes, each said short rod being of a diameter to electrically engage the contact leaves of the jacks of the aligned row of holes in which the rod is inserted, and each said short rod being made of a length to extend through selected sections of the assembled chassis to electrically connect selected elements of the different sections of the apparatus.

ADRIAN R. DOUCETTE.

REFERENCES CITED

The following references are of record in the file of this patent:

UNITED STATES PATENTS

| Number | Name | Date |
|---|---|---|
| 1,492,309 | Ogden | Apr. 29, 1924 |
| 1,527,896 | Miller | Feb. 24, 1925 |
| 1,993,436 | Eberhard | Mar. 5, 1935 |
| 2,077,160 | Wilson | Apr. 13, 1937 |
| 2,185,562 | Nielson | Jan. 2, 1940 |
| 2,446,701 | Greene | Aug. 10, 1948 |

OTHER REFERENCES

Radio-Craft for January 1939 (pages 400, 401 and 431 only).